(12) United States Patent
Mendelson

(10) Patent No.: US 7,899,583 B2
(45) Date of Patent: Mar. 1, 2011

(54) SYSTEM AND METHOD OF DETECTING AND NAVIGATING TO EMPTY PARKING SPACES

(76) Inventor: Ehud Mendelson, Coral Springs, FL (US)

( * ) Notice: Subject to any disclaimer, the term of this patent is extended or adjusted under 35 U.S.C. 154(b) by 543 days.

(21) Appl. No.: 11/396,843

(22) Filed: Apr. 3, 2006

(65) Prior Publication Data

US 2006/0253226 A1    Nov. 9, 2006

Related U.S. Application Data

(60) Provisional application No. 60/670,097, filed on Apr. 12, 2005.

(51) Int. Cl.
*G06F 17/00* (2006.01)
(52) U.S. Cl. ........................................ 701/1; 340/932.2
(58) Field of Classification Search ............... 701/1, 701/200–202, 207, 213–215; 340/932.2, 340/995.12, 539.1
See application file for complete search history.

(56) References Cited

U.S. PATENT DOCUMENTS

| | | | |
|---|---|---|---|
| 3,114,128 A | 12/1963 | Ljungman | |
| 3,130,298 A | 4/1964 | Schwarz | |
| 3,158,836 A | 11/1964 | McCauley | |
| 3,166,732 A | 1/1965 | Ljungman | |
| 3,867,615 A | 2/1975 | Sioufi | |
| 5,272,483 A | 12/1993 | Kato | |
| 5,293,163 A | 3/1994 | Kakihara | |
| 5,383,127 A | 1/1995 | Shibata | |
| 5,416,712 A | 5/1995 | Geier | |
| 5,432,508 A | 7/1995 | Jackson | |
| 5,442,348 A | 8/1995 | Mushell | |
| 5,454,461 A | 10/1995 | Jacobs | |
| 5,504,482 A | 4/1996 | Schreder | |
| 5,606,506 A | 2/1997 | Kyrtsos | |
| 5,910,782 A * | 6/1999 | Schmitt et al. | 340/995.12 |
| 5,940,481 A | 8/1999 | Zeitman | |
| 6,970,101 B1 * | 11/2005 | Squire et al. | 340/932.2 |
| 7,026,954 B2 * | 4/2006 | Slemmer et al. | 340/932.2 |
| 2006/0033641 A1 * | 2/2006 | Jaupitre et al. | 340/932.2 |

\* cited by examiner

*Primary Examiner*—Yonel Beaulieu
(74) *Attorney, Agent, or Firm*—Gold & Rizvi, P.A.; Glenn E. Gold; H. John Rizvi

(57) ABSTRACT

The parking detection system method described herein could guide people around urban environments detect guide and navigate them to empty parking spaces, add-on to the car-based navigation systems and or to the cellular phone. We have focused on the task of detecting and navigating even in situations in which Global Positioning Systems (GPS) cannot provide this information, such as when the person is indoors or in crowded urban areas where there is no line of site to the GPS satellites and without the need for central computer system or internet connections. The parking information will be received directly from RF sensors and will display as a floating overlay on the existing navigation system and or cellular phone as Bluetooth application.

24 Claims, 5 Drawing Sheets

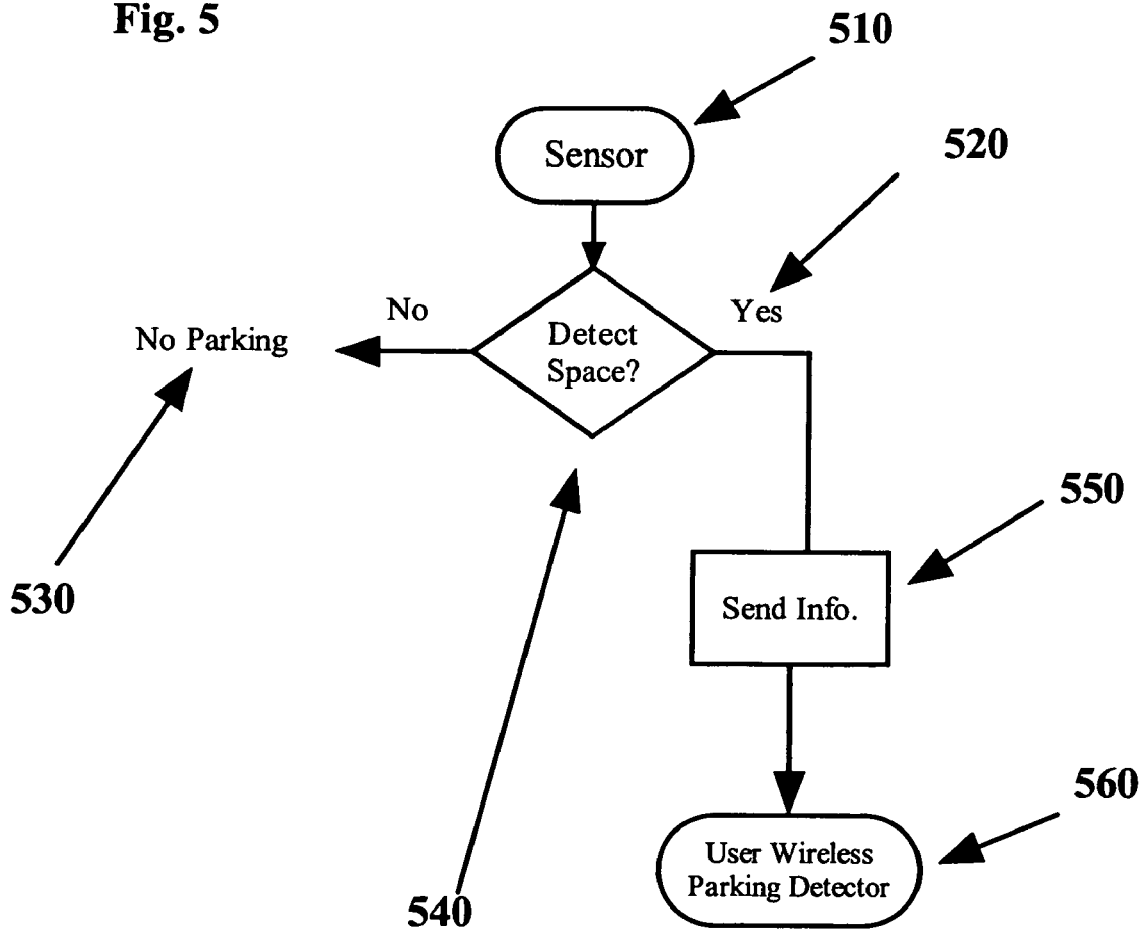

SYSTEM AND METHOD OF DETECTING AND NAVIGATING TO EMPTY PARKING SPACES

RELATED APPLICATIONS

This application is a Non-Provisional Application, claiming the benefit of U.S. Provisional application No. US60/670,097 filed Apr. 12, 2005, which is incorporated herein in its entirety.

FIELD OF THE INVENTION

This invention is directed generally to the field of location based navigation and, more particularly, to such systems and the method to be used in detecting and navigating to empty available parking spaces.

BACKGROUND OF THE INVENTION

Location based services are rapidly expanding. Outdoor location technologies are mainly based on GPS technologies. GPS does not perform properly indoors, and is not adequate; recently, as a result, indoor location systems are appearing on the market.

The need for a system such as ours stems from various market segments and applications. One example, in the market for integrated positioning and navigation systems using GPS receivers as their primary positioning technology, is the "Car navigator".

However, a major limitation of GPS is that uninterrupted satellite reception is not possible in many situations. Densely populated areas and radio-frequency-signal shadowed locations, such as urban centers ("urban canyons"), generally do not allow proper operation of GPS, yet it is in these locations that the need is greatest.

There is a clear need for a cost effective system that maintains performance indoors, in urban canyons and in city centers.

Another important issue, GPS itself is susceptible to jamming and other man-made interference.

Description of GPS System.

The Global Positioning System (GPS) is a satellite-based navigation and time transfer system developed by the U.S. Department of Defense. GPS serves marine, airborne and terrestrial users, both military and civilian. Specifically, GPS includes the Standard Positioning Service (SPS) that provides civilian users with 100 meter accuracy as to the location or position of the user. It also serves military users with the Precise Positioning Service that provides 20-meter accuracy for the user. Both of these services are available worldwide with no requirement for any local equipment.

View of GPS Limitations:

First limitation of GPS is that upon activation the GPS receiver scans for signals from the GPS satellites. The unit must locate and receive signals from at least four satellites to be able to determine its location. This process of locating the satellites, receiving the data and achieving a position fix can take several minutes. This delay can be problematic for many GPS applications.

Second limitation of GPS is that the receiver needs a clear view of the sky to successfully receive signals from the satellites, again under unfriendly RF conditions such as inside buildings, or in "urban canyons" or under shadows of high buildings, the GPS suffers from multi-path effects and therefore shows poor performance, or none at all.

Third Limitation—limited accuracy: There's a problem of limited accuracy of civilian GPS signal. While knowing your position to within 50-200 feet anywhere on the planet is a major technological feat, it's still not accurate enough, to locate and navigate to an empty parking space, where each space measures about 10 feet, and most parking garages are located where the GPS is cannot work effectively.

Most of the navigation systems, such as the in-car navigation system, are based on GPS and have the aforementioned limitations.

Another significant factor adding to the limitations of the GPS based systems is the important role of map production; it is obvious that the user, driver, requires a map to be as detailed and as up-to-date as possible. However the existing maps used by the GPS based systems provide limited detail and the changes are not reflected on a timely basis In this modern age when urban development is exploding, the lack of details and updates of the topographic maps and satellite images is critical; additionally and importantly, indoor location maps are not available at all for the GPS navigation systems.

Application:

In general, our system is based of applying machine-learning techniques to the task of inferring aspects of the user's state from a stream of input from sensors.

We have focused on indoor navigation, or navigation in crowded urban areas, where GPS based systems, due to lack of access to satellites or the GPS limitations detailed previously, cannot achieve the required results.

We have focused on the task of interactively guiding the user to a desired indoor destination.

Our system has a minimal need to know the user's location to carry out this task.

Examples of Indoor Applications:

The user may be looking for a certain store in a shopping mall, or a particular aisle in a department store.

The user may be looking for a certain conference room in a convention center, for a point of interest in an amusement park or for a point of interest in a museum.

The user may be looking for a train location in a station, or stops in a large subway or underground train station.

Or may just want to find available parking space.

Parking Detection and Navigation Application:

There is no easy way to find empty parking spaces in a busy city. Drivers usually either wastes time driving around the area looking for an open space, or abandons the search, paying a large fee to park in a garage, or to use a valet parking service. It would be very advantageous to be able to provide a driver looking for a parking space with Parking Detector, capable of identifying available, empty parking spaces in the driver's proximity, and with a competitive edge over someone without such a Parking Detector.

Every working day 105 Million drivers are looking for a place to park!

It is estimated that 40% of urban traffic is due to this "Search for parking a space."

The top 85 US cities face increasing congestion problems because of steady population growth and the lack of locations to build additional parking. Traffic congestion is estimated to cost travelers in the 85 biggest US cities a whopping 3.5 billion hours a year, more than 50 hours a year per driver in major cities, almost a week of work.

Traffic and traffic congestion are two main reasons for pollution, and vehicle emissions contribute significantly to the "green house effect".

In our society where time, convenience and comfort are precious commodities, parking is a major perk, or major headache.

Our "Parking Detection System" provides the answer to the most demanding need of any driver, "Where can I park?"

With the implementation of our system, navigating and detecting available parking spaces will become part of the information revolution.

Our system, a network of self organizing sensors will enable municipalities and other parking authorities to easily identify, exploit and manage revenue opportunities while at the same time providing better service at a lower operating cost.

With our system, drivers will save time, reduce the frustration of hunting for parking spaces and also will save money on gas usage and car maintenance costs.

By using and modifying existing technology, our system will integrate easily with other transportation and communication systems.

Reference to Prior Arts:

Despite the problems encountered by vehicle operators at parking facilities, most existing parking monitoring systems focus on collecting information for management. Some prior art systems employ sensors at entrances and exits to parking facilities or sections of such facilities (See U.S. Pat. No. 3,130,298 to Schwarz). These sensors trigger a counter to determine the number of cars in the monitored area by subtracting the number of cars leaving the area from those that have entered. At least one of these monitoring systems also engages a timer to determine the aggregate usage time of the facility by summing the total time from the entry of the cars to their departure (See U.S. Pat. No. 3,867,615 to Sioufi). These systems profess to be useful in monitoring the usage of the parking facility.

Prior Art curbside parking monitoring systems have been coupled with centralized signals which indicate general areas where drivers may find a curbside parking space (See U.S. Pat. Nos. 3,114,128 and 3,166,732 to Ljungman). Upon sensing that a space adjacent a parking meter is vacant, the system signals drivers from a signpost at an intersection of the city block along which the parking space is vacant. The signal appears in a binary yes or no stating that one or more parking spaces are available in the adjacent block-long area. However, because the driver seeing a parking available signal is not advised of the number and specific location of parking spaces that are available in that block, the vehicle operator may proceed to the indicated location to find that a single available space has already been occupied or that the space will not accommodate his vehicle. In either situation, the binary availability signal may lead the vehicle operator on a fruitless quest.

Another monitoring system for a parking facility compares the number of cars within a designated area (determined by counting cars entering minus cars departing the area) with the number of spaces within that area. When the net number of cars equals the number of spaces, the system registers that the area is completely full and signals drivers to proceed to the next area (See U.S. Pat. No. 3,158,836 to McCauley). Unfortunately, such systems again only yield a binary yes or no signal to the drivers. Even if an area contains only one available space, even if the space is obstructed, will not accommodate the driver's car, or is otherwise undesirable, a driver still will be lead to that area.

These prior art systems are of only limited help to vehicle operators and do not resolve many concerns associated with parking an automobile.

U.S. Pat. No. 5,293,163 to Kakihara, et al., entitled, "Navigation Apparatus for Vehicles", describes a system for finding garages or other parking facilities with available parking spaces. It provides for the display of available parking information in map format. This vehicle navigational system patent does not address the problem of locating available on-street parking. Instead, it addresses the problem of locating parking lots with available spaces. Parking lots in congested city areas are not very cost effective, and they may not be in close proximity to the driver's destination. The patent does not direct drivers directly to an available metered space, a less expensive alternative, but simply to a large parking lot where they will have to search for an available space. In addition, the Kakihara map display only directs the driver as far as a parking facility. The driver still must navigate around the parking facility to locate an available space.

U.S. Pat. No. 5,432,508 to Jackson, entitled, "Technique for Facilitating and Monitoring Vehicle Parking", describes a scheme for finding available parking spaces in garages and other parking facilities. It provides for the display of available parking information at the entrance of a garage and makes a provision for a light source to be mounted above a parking space to indicate its availability. Remote access to the data is provided by a dial-up telecommunication interface. Because the technique described operates over a wireline medium, it does not lend itself to being easily deployed in a wide area. Also, because parking information is never provided to any device within a vehicle, drivers still need to navigate through a garage to locate available spaces.

Parking meters with sensors, parking meters with transmitters, and navigational equipment receiving and displaying external information are well known in the art. U.S. Pat. No. 5,442,348 entitled, "Computerized Parking Meter", for example, describes a parking meter utilizing an ultrasonic transducer to detect when a car is occupying a parking space. Similarly, U.S. Pat. No. 5,454,461, entitled, "Electronic Parking Meter and System", describes a parking meter utilizing a sonar transducer for parked vehicle detection and radio means for receiving billing information.

At present, there is no on-board vehicle navigational system that delivers accurate and real time parking space information directly from the vehicle or ether portable phone application upon entering a specific geographic area.

Accurate Navigation

U.S. Pat. No. 5,504,482 to Schreder describes an automobile equipped with an inertial and satellite navigation system as well as a local area digitized street map. The main use of this patent is for route guidance in the presence of traffic jams, etc. Schreder describes how information as to the state of the traffic on a highway can be transmitted and utilized by a properly equipped vehicle to change the route the driver would take in going to his destination. Schreder does not disclose sub-meter vehicle location accuracy determination Vehicle Location U.S. Pat. No. 5,272,483 to Kato describes an automobile navigation system. This invention attempts to correct for the inaccuracies in the GPS system through the use of an inertial guidance, geomagnetic sensor, or vehicle crank shaft speed sensor. However, it is unclear as to whether the second position system is actually more accurate than the GPS system. This combined system, however, cannot be used for sub-meter positioning of an automobile.

U.S. Pat. No. 5,383,127 to Shibata uses map matching algorithms to correct for errors in the GPS navigational system to provide a more accurate indication of where the vehicle is or, in particular, on what road the vehicle is. This procedure does not give sub-meter accuracy. Its main purpose is for navigation and, in particular, in determining the road on which the vehicle is traveling.

U.S. Pat. No. 5,416,712 to Geier, et al. relates generally to navigation systems and more specifically to global positioning systems that use dead reckoning apparatus to fill in as backup during periods of GPS shadowing such as occur amongst obstacles, e.g., tall buildings in large cities. This patent shows a method of optimally combining the information available from GPS even when less than 3 or 4 satellites are available with information from a low-cost, inertial gyro, having errors that range from 1-5%. This patent provides an excellent analysis of how to use a modified Kalman filter to optimally use the available information.

U.S. Pat. No. 5,606,506 to Kyrtsos provides a good background of the GPS satellite system. It discloses a method for improving the accuracy of the GPS system using an inertial guidance system. This is based on the fact that the GPS signals used by Kyrtsos do not contain a differential correction and the selective access feature is on Locating a vacant parking space is an ordeal that causes frustration for many commuters. Even if a commuter pays to enter a parking lot, valuable time is consumed searching for a parking space within the parking lot. It seems that parking lots that service hospitals, airports, mass transit stations, entertainment forums, shopping malls and the like are always the most crowded, when time is the most crucial. As urban and suburban regions become more populated, finding a vacant parking space will become increasingly difficult for commuters.

U.S. Pat. No. 5,910,782 to Schmitt et al. ('782 patent) discloses a system for finding available on-street parking using an on-board vehicle navigation system and parking meters equipped with sensing devices. According to the '782 patent, real time metered parking space information can be accessed from a central location or directly by a vehicle, upon entering a specific geographic area.

U.S. Pat. No. 5,940,481 to Zeitman ('481 patent) discloses a parking management control system used to report parking, monitor parking and reserve parking spaces. According to the '481 patent, a user reports parking in a particular parking facility to a central control unit using a personal non-dedicated mobile communications device. The central control unit then confirms whether parking in the particular parking facility is authorized or not. The central control unit also generates a report indicating which parking facilities are supposed to be vacant for law enforcement officials so that unauthorized parking can be ticketed. The '481 patent also discloses that a user can reserve a desired parking facility by selecting a desired parking facility from a map provided from the central control unit. If a potential user, other than the registered user, communicates a request to park in the reserved parking facility, the control unit transmits a response to the potential user indicating that the parking facility is reserved and not authorized for use.

At present, however, no prior art device utilizes the capabilities to display a real-time representation of available parking spaces directly from the sensors without central system. And without using a GPS system directly to the "user" driver. Also most of them are for the parking garage or solutions to parking meters area when our system is for any places designate as parking space, ether in-door, out door, public or private. Our system based on sensors that detect the empty space where most of the other detect the car.

Other depends on a request to be sent to a central system or a database for parking where our system is a direct parking detector from the sensors.

Again, most of the existing prior arts are base ether on a GPS system or ether the existing car navigator (depend on a GPS to), and the existing mapping that they use has the same limitation as describe before and therefore practically can't be implements and work.

We believe that interface to the Internet can be a solution only for a remote planning and not a local solution where the driver is looking for a parking NOW!

We believe that our system method bridge the gap between the GPS based navigation and the existing system and allow to a complete solution.

Project in Parking:

XM Radio in conjunction with partners NU-Metrics inc. and infoGation, introduce a "parkingLink" capability concept.

The system shows the actual number of spaces available at designated parking facilities on vehicle navigation map, and uses color-keyed icons to indicate the percentage availability of the facility. The driver still must navigate around and inside the parking facility to locate an available space.

Parkingcarma from ACME Innovation, that is based on sensors that count the cars driving in and out of the parking facility and inform drivers via a cell phone call, or by an electronic sign, or over the internet, regarding the availability in the parking garage. The driver still must navigate around and inside the parking facility to locate an available space.

Other parking projects exist but they do not approach our innovation in ability to deliver a complete solution to the parking problem. Other projects address the issue from the perspective of a parking garage and do not consider street parking, nor are they really concerned to facilitate the location of an empty space inside their garage. They do not provide the driver with the ability to compare prices in the vicinity. Nor do other projects contemplate the concept of a parking detector with a direct communication between the sensors and the "user" driver in real-time#

Indoor Location Technologies

Various technologies are used for wireless indoor location. These may be classified in two aspects: The algorithm, i.e. the method of location used and the physical layer, i.e. the wireless technology used to communicate with the mobile device.

Location Methods

The methods typically used in indoor location are "borrowed" from the outdoor GPS location methods inventory. Specifically, four types of methods are used indoor:

Proximity Detection (PD), Received Signal Strength (RSSI), Time of arrival (TOA), and Angle of Arrival (AOA).

Proximity Detection (PD)

This method relies upon a dense grid of antennas, each having a well-known position. When a mobile is somehow detected by a single antenna, it is considered to be collocated with it. When more than one antenna detects the mobile, it is considered to be collocated with the one that receives the strongest signal.

This method is relatively simple to implement. It can be implemented over different types of physical media. In particular, IR and RFID are based on this method.

Triangulation

Triangulation takes PD a step further, in the sense that it is based on measuring the signal level measurements from each antenna (possibly by using a triangulation mechanism), with respect to each mobile device. Following that, mobile is located by using a triangulation algorithm. Like the PD method, triangulation is relatively simple to implement.

Time of Arrival (TOA)

TOA is based on triggering the mobile devices to respond, and measuring the time it takes for the response to flyback to the antenna. The elapsed time represents the distance between the two. By using distances from few antennas, a mobile's position can be triangulated. TOA considered to be the most accurate method, because multipath effects can be filtered out, Yet, it is considerably more complex to implement, as it requires a modified hardware on the mobile side, as well as special modifications on the antenna side.

Angle of Arrival (AOA)

AOA is based on finding the direction of maximal signal intensity for each antenna-device pair. By finding the intersection of few such direction vectors, a mobile's position can be estimated AOA is considerably less accurate than TOA, due to limited angular resolution and the fact that indoor much of the signal is reflected. Also, AOA antennas are more complex, as they require multi-section, highly directional antennas, and multiple RF circuitry.

WLAN (IEEE 802.11b)

This midrange wireless local networking standard, operating in the 2.4 GHz ISM band, has become very popular in public hotspots and enterprise locations during the last few years. With a typical gross bit rate of 11 Mbps and a range of 50-100 m, IEEE 802.11b is currently the dominant local wireless networking standard. It is therefore appealing to use an existing WLAN infrastructure for indoor location as well, by adding a location server. Such solutions do exist in the market, providing an accuracy of about 2 m. One limitation of such systems is the fact that WLAN tags are relatively bulky and power hungry. Thus, such locators are mainly useful to locate WLAN enabled instruments, such as portable computers.

Note that in WLAN, antennas are actually part of access points (APs), through which devices communicate with the access network. This is also the case with Bluetooth.

Bluetooth (IEEE 802.15)

Bluetooth is a newer wireless local networking standard, that operates in the 2.4 GHz ISM band. Compared to WLAN, the gross bit rate is lower (1 Mbps), and the range is shorter (typically 10-15 m, though there are Tags with a range of over 300 feet). On the other hand, Bluetooth is a "lighter" standard, highly ubiquitous (embedded in most phones, PDA's, PC peripherals, etc.) and supports, in addition to IP, several other networking services. Notably, Bluetooth supports serial port emulation, voice, and various types of object exchange.

Bluetooth tags are small, pocketsize transceivers.

Every Bluetooth device's tag has a unique ID. This ID can be used for locating the tag.

SUMMARY OF THE INVENTION

In accordance with the present invention, it is our Project's objectives:

Our system is not a location and tracking system as offered by most other systems; it is a navigation method based on the following unique characteristics:

Most locations, buildings, malls, stores, museums, parks, city centers, subways, railways, etc., already have their own basic floor plans. Our sensor net, and sensor tags in an indoor/outdoor navigation situation, replace the satellite in the GPS based system to calculate and locate the "user" track. Our innovation had 3 major parts: the sensors, the parking detector and the special method to display it on.

The sensors, An RF motion sensor network that detects where the vacancy in a parking space is available.

A very small RF sensor installed in each parking space, any place designated as parking space ether parking meter, parking garage, street parking inside or outside public or commercial. The sensor can be RFID (long range type), a long range Bluetooth, a WiFi or any RF type. It broadcasts a unique ID by wireless that identifies the location of the parking space (unique parking ID, address, and price). The sensor recognizes the vacancy and broadcasts the vacancy to be received by the parking detector. The system can generate a parking ticket (e.g. for a parking garage) with the exact free parking space. Additional lens/screens for information can be installed at the corners of the parking lines—assisting drivers to locate available parking space. Similar lens/screens can be installed on street corners, open parking garages or on or for parking meters for drivers' guidance.

The parking detector, the parking detector (in a process of trade mark) will receive the broadcasting parking sensors in the area around the "user" with interface to his existing in-car navigation system and or his cellular telephone as an application that utilize the cellular phone Bluetooth device (no cellular communication or internet or database access needed) or any Bluetooth enable device that will run our parking detector application as a stand alone device.

The display method is our unique way to bridge the existing devices like car navigation and Bluetooth devices and existing GPS mapping with the limitation that describe before with a simple application method, In a cellular phone application or in any other device Bluetooth devices or in the existing in-car navigation, we will provide our overlay add-up display method as an add-on to the existing navigation system as a real-time floating overlay omni directional circular display to overcome the limitations of GPS based systems and the existing mapping systems.

The overlay add-up device/display can work even without mapping at all, a VOR like add-up display will show the available parking spots in the immediate area without the need for a mapping background; mapping can be offered as an additional service. No regenerating of mapping is necessary.

Another option is to download a the floor map containing destination maps from a remote location, internet or destination guide—parking guide over the web as a new way of planning a route and navigating at the destination. Our navigation system method will enable remote navigation based on the downloaded local floor plan, or locally, when the location's floor plan can be downloaded at the destination. An example of this would be at the entrance of the parking garage, shopping mall, department store, amusement park, museum or the city down town area.

Our system is based on a network of sensors that can be deployed anywhere, not just in parking lots or parking garages.

The System is accurate to within 10 feet, well ahead of the navigation and GPS

The system can work inside a building whereas GPS cannot.

Local detection is obtained via popular Bluetooth interface.

The system provides information about each parking space's availability, including information about the price and type of space. Example: regular, handicap etc.

The system overcomes the anxiety of "Where will I park" (or return to parking RTP) by providing the ability to locate a space in advance from your Bluetooth enabled device or your cell phone with our parking detector application.

The system can become the "Next generation parking meter".

Automatic payments can be handled via a system such as "Sun Pass" or other established account.

The system can afford established account/card holders (e.g. Sun Pass members) the option to make a parking reservation in advance.

The system can be an additional feature for city WI-FI . . . or being part of the deployment.

The system can serve as security add-on by providing authorities with information about a parked car in case of an emergency or security situation. No need to be in the area where the information about the parking cars can be transmitting to the authorities by remote.

Using the system, municipalities and parking facilities can manage better, compile helpful statistics and increase inventory control of the parking spaces resulting in better service and increased availability.

The system eases navigation to a parking space, without a navigation map or GPS. Mapping background can be provided as an additional feature on our system.

The system provides "Local" detection as well as "Remote" detection.

The system allows easy implementation to existing networks. And parking system

The system saves gas, time, money and eases global warming.

Our system is based on a network of sensors that can be deployed anywhere, not just in parking lots or parking garages. The network can be deployed in any location designated for parking. The location can be private or commercial, street or mall, metered or not, free space or charged.

Our parking detection method is unique. We base our system on RF sensor tags with interface to Bluetooth enabled devices This feature allows detection inside a building where GPS cannot work, as well as outside, with the capability to guide the driver to within 10 feet of the destination (i.e. a parking space), significantly better than any other navigation and GPS based systems on the market.

Our Bluetooth/RF sensor is based on a long-range version of the popular short distance communication. This unique feature affords the user the ability to plan ahead where to park by obtaining data directly from the parking sensors and from remote by accessing the inventory of available parking spaces at the destination from data broadcast by Parking Guide.

One problem with In-Car navigation and or GPS mapping is that they cannot guide the user to closer then 50-200 feet, and only in open places, whereas our solution can provide accurate directions to within 6 to 10 feet, and to pinpoint the right parking space.

Our system will be a challenge to the navigation providers as well as the GPS providers as they cannot provide mapping or navigation inside the parking garage or lot, and in street parking the GPS/Navigation map cannot accurately locate the parking space.

Utilizing our patent pending innovation the available parking spaces in the vicinity around the "user" car are displayed on a floating overlay using either an existing installed navigation system or a stand alone device without any mapping at all.

Navigation using the mapping or floor-plan of a location can be offered as an additional service, although it may not be necessary or needed, as the "user" will have easy way to figure out the distance and the direction to the empty parking spaces without GPS or any mapping . . . !

The option of downloading a floor plan can be exercised either remotely or locally.

The parking sensors broadcast their signal continuously and any of our parking detectors will detect them and display the data on the "user" device in an easy to understand method.

With our innovation you have the parking information that you want, when you want it, where you want it . . . (and at a price you can afford . . . ).

Once you are in the vicinity of your destination and you switch on your detector, you will automatically receive the parking information along your route (in all directions around you). No further action is required (there is no need to send a request or to access the internet/web or log on and search a database or central system . . . !!!).

Our unique approach does not need an internet bandwidth nor cellular communication at all . . . .

And as a result there is no delay or waiting for communication and access time, the communication is instantaneous, directly between the sensors and the "user" parking detector.

Parking detector, the empty parking spaces will be displayed inside a graphical real-time floating omni-directional circular display in such way that the "user" will intuitively determine the distance and the direction to the empty parking spaces.

Additionally, each parking space will be shown with a simple color-coded to identify the type of the parking space, e.g. regular of handicap.

Each color-code display of an empty parking space can be accessed to obtain complete information about the parking space, e.g. price and automatic waypoint information.

Each circular line represents 50' feet in distance from the "user"/car.

This makes it easy for the "user" to calculate the distance to the parking space.

The ability to operate our innovation on an existing in-car navigation system, or using a cellular phone as an application—parking detector (no need for cellular connection), or a stand alone device, means the "user" can use it even if his car not equipped with a built-in navigation system.

Or the parking data can be displayed by a clear, heads-up display on the driver's windshield for the next generation parking detector.

More over, our innovation can solve the "RTP" (Return to parking) problem, where many forget where they parked their car. The system has an option to save the location on the "cellular phone—parking detector" application, which will make it easy to locate the parked car.

Our solution is designed for global use and is not limited to parking garage or parking meters spaces. Our innovation can be implemented anywhere, in any place designated as parking space . . . !

It is our intention that any new construction designated as parking space will have the sensor tags built in to the design for future use and benefit of drivers . . . !.

With our innovation, the next generation parking meter can be . . . no meter at all, with automatic recognition and automatic payments.

The ability to make "Remote" reservations will be future option.

We integrated the parking system as part of our NAV4 concepts where it will provide complete solutions for local navigation in an area where the GPS can't work.

Conclusion and Benefit

Driver Benefit:

Reduced search for parking

Reduced traffic

Parking availability ensured at trip destination.

Pre-trip parking information

Future option for a pre-trip or during trip parking reservation

Parking Sector:
Parking occupancy enhanced
Additional customer service
Better management control
Municipalities:
Reduced searching for parking by drivers
Reduced traffic
Reduced pollution
Better control of parking spaces
New source of income

BRIEF DESCRIPTION OF THE DRAWINGS

A complete understanding of the present invention may be obtained by reference to the accompanying drawings, when considered in conjunction with the subsequent, detailed description, in which:

FIG. 5 is a flow diagram of the parking detector in accordance with the present invention.

DESCRIPTION OF THE PREFERRED EMBODIMENT

Figure 1:
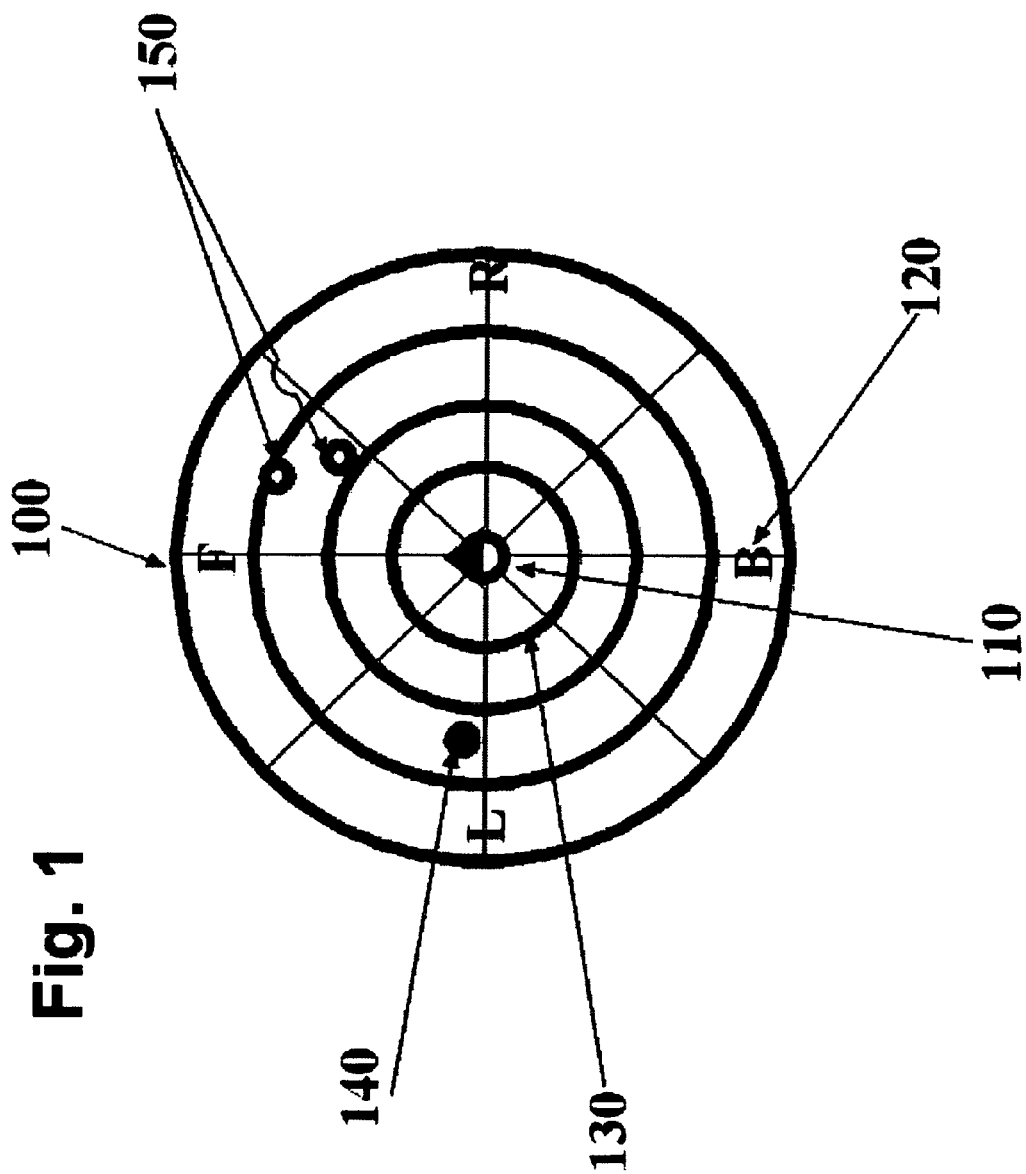
FIG. 1 is an illustration of the parking detector floating overlay display method in accordance with the present invention.

In all the figures of the drawing, sub-features and integral parts that correspond to one another bear the same reference symbol in each case:

Referring now to the figures of the drawings in details and first particularly to FIG. 1-5 thereof. There is shown an illustration of the method and system to detect and navigate to empty parking spaces.

The method contain the floating overlay display 100, a real-time floating overlay omni-directional circular display to overcome the limitations of the GPS based systems and the existing mapping systems.

The "user" will have easy way to figure out the distance and the direction to the empty parking spaces without GPS or any mapping.

The empty parking spaces will be displayed inside the graphical real-time omni-directional circular display in such way that the "user" will intuitively determine the distance and the direction to the empty parking spaces.

Each parking spaces will be shown with a simple color code to identify the type of the parking space e.g. 150 for example with green color will represent a regular empty parking space where 140 in color red for example will represent a handicap empty parking space.

Each color code display of an empty parking space can be access to obtain complete information about the available parking space e.g. price and automatic waypoint information.

Each circular line 130 represents 50' in distance from the "user"/car. This makes it easy for the "user" to calculate the distance to the available empty parking space.

Moreover to make it easy to determine the directions and the location of the empty available parking spaces 140 and 150 the display circular divide to 4 parts represent as 120 B=back to the driving direction 110 as represent the car heading, R=as the right to the "user" driving direction and L=left to the driving direction as well as F=as front forward to the "user" car heading direction. Each of the empty parking spaces 140 and 150 are result of the broadcast directly from the parking sensor in the area of 300' around the "user" car.

A very small RF sensor installed in each parking space, any place designated as parking space ether parking meter, parking garage, street parking inside or outside public or commercial. The sensor can be RFID (long range type), a long range Bluetooth a WiFi or any RF type. It broadcasts a unique ID by wireless that identifies the location of the parking space 140 and 150 (unique parking ID, address, and price). The sensor recognizes the vacancy and broadcast it to be received by the parking detector 100.

The overlay add-up device/display can work even without mapping at all, the VOR like add-up display will show the available parking spots in the immediate area without the need for a mapping background; mapping can be offered as an additional service. No regenerating of mapping is necessary.

Figure 2:
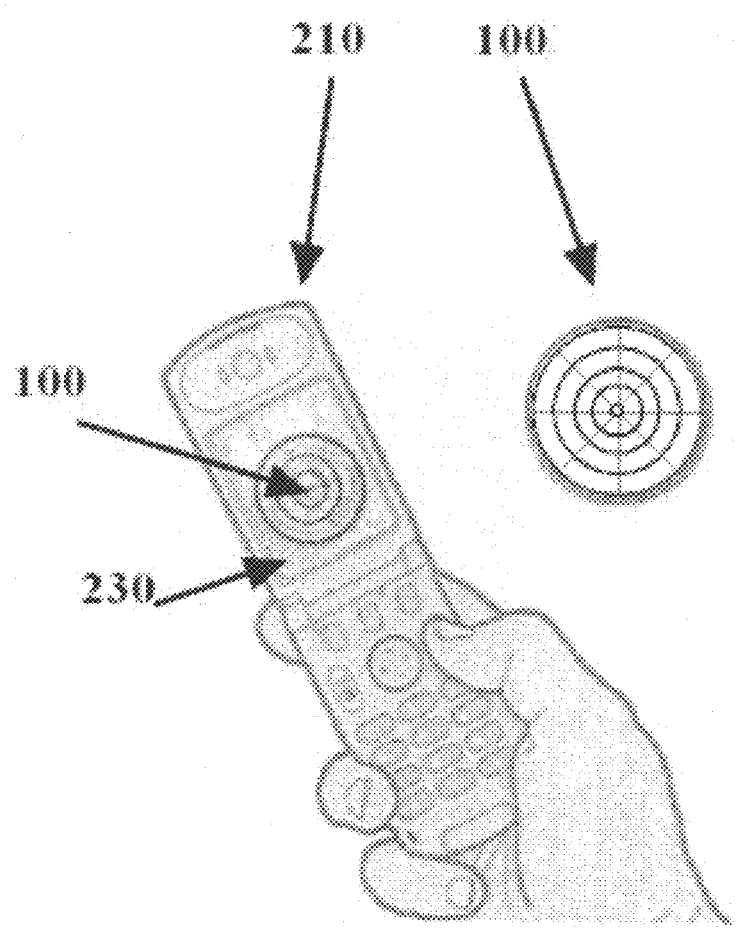
FIG. 2 is an illustration of the parking detector on a cellular phone in accordance with the present invention.

Referring to FIG. 2, its show the floating overlay parking detector 100 on cellular phone 210 as a Bluetooth cell phone application, there is no need for cellular communication or any internet web communication or any central system nor any access to a database.

We utilize the cellular phone 210 only as a Bluetooth enable device and the application overlay floating circular display 100 parking detector will run over ether GPS existing mapping or over a background of the area floor plan 230 that can be ether download before access the parking area to plan ahead or download via Bluetooth or WiFi at the entrance to the parking area.

Again, the mapping 230 or floor plan background is not critical to the navigation as the "user" will have easy time to determine and locate and navigate to the empty parking spaces without the background mapping or the floor plan, no generation of mapping needed at all.

Moreover by making the cellular phone 210 a parking detector even without any communication ether cellular or internet and using the telephone as a Bluetooth device any "user" even if his car not equipped with built-in navigation will have the option to determine the area empty spaces and use his telephone as parking detector.

It must be explain that there is a deference between using the cellular phone 210 to receive information from the web or central database to our method when the cellular phone using our parking detector Bluetooth application will received directly information broadcast directly from the parking sensors.

Figure 3:
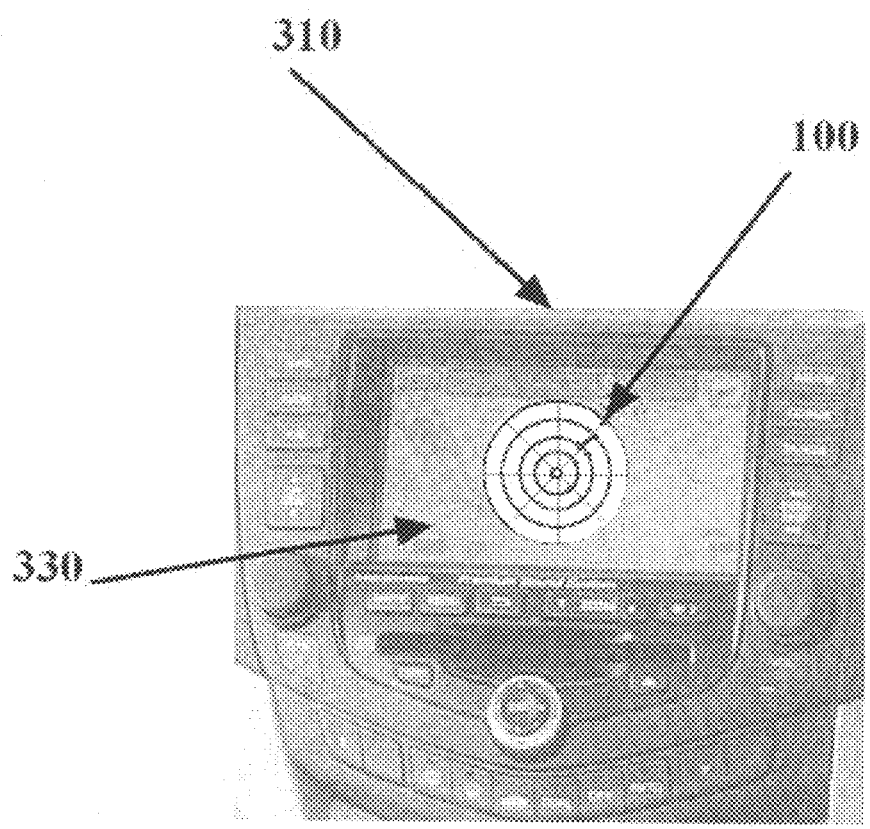
FIG. 3 is an illustration of the parking detector on a car-navigation in accordance with the present invention.

Turning now to FIG. 3. It is show the floating overlay parking detector 100 on a car navigation system 310 as an interface to the existing navigation system. The floating overlay parking detector 100 on the car navigation 310 as a Bluetooth interface, there is no need for cellular communication or any Internet web communication or any central system nor any access to a database.

The overlay floating circular display 100 parking detector will run over ether GPS existing mapping or over a background of the area floor plan 330 that cab be ether download before access the parking area to plan ahead or download via Bluetooth or WiFi at the entrance to the parking area.

Again, the mapping 330 or floor plan background is not critical to the navigation as the "user" will have easy time to determine and locate and navigate to the empty parking spaces without the background mapping or the floor plan, no generation of mapping needed at all.

Figure 4:
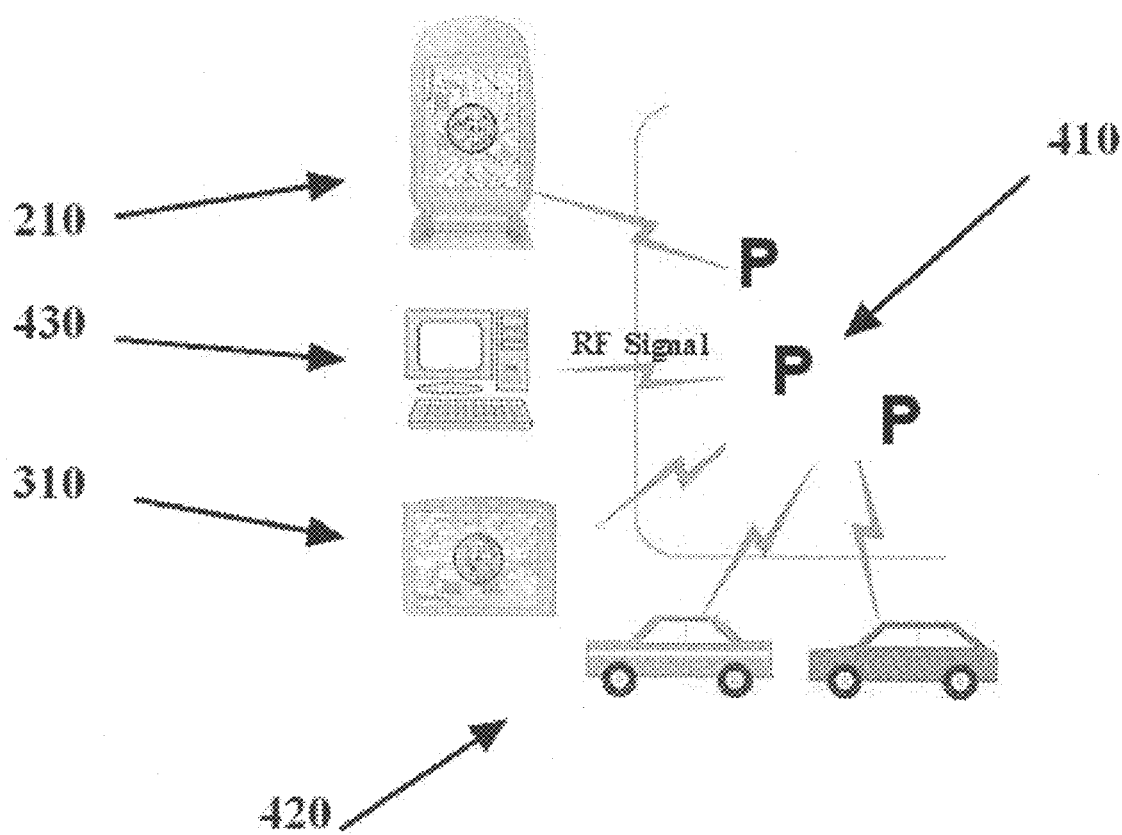
FIG. 4 is an illustration of the parking detection system environment in accordance with the present invention.

Referring to FIG. 4, the illustration of the detection system includes the parking sensors 410, the sensors 410, and an RF motion sensor network that detects where the vacancy in a parking space is available.

A very small RF sensor installed in each parking space, any place designated as parking space ether parking meter, parking garage, street parking inside or outside public or commercial the sensor can be RFID (long range type), a long range Bluetooth a WiFi or any RF type. It broadcast a unique ID by wireless that identifies the location of the parking space (unique parking ID, address, and price). The sensor recognizes the vacancy and broadcast it to be received by the parking detector application on ether cellular phone 210 or car navigation 310 in-car 420 navigation system. The system can generate a parking ticket (e.g. for a parking garage) with the exact free parking space. Additional lens/screens for information can be installed at the corners of the parking lines—assisting drivers to locate available parking space. Similar lens/screens can be installed on street corners, open parking garages or on or for parking meters for drivers' guidance.

Our solution is designed for global use and is not limited to parking garage or parking meters spaces, the present innovation can be implemented anywhere, in any place designated as parking space . . . !

It is our intention that any new construction designated as parking space will have the sensor tags built in to the design for future use and benefit of drivers . . . !.

With our innovation, the next generation parking meter can be . . . no meter at all, with automatic recognition and automatic payments.

The ability to make "Remote" reservations will be future option.

We integrated the parking system as part of our NAV4 concepts where it will provide complete solutions for local navigation in an area where the GPS can't work.

Our Bluetooth/RF sensor 410 is based on a long range version of the popular short distance communication. This unique feature affords the user the ability to plan ahead where to park by obtaining data directly from the parking sensors and from remote by accessing the inventory of available parking spaces at the destination from data broadcast by Parking Guide 430.

Or the parking data can be displayed as a clear, heads-up display on the driver's windshield of his car 420 for the next generation parking detector.

More over, our innovation can solve the "RTP" (Return to parking) problem, where many forget where they parked their car. The system has an option to save the location on the "cellular phone—parking detector" application, which will make it easy to locate the parked car.

The parking sensors 410 broadcast their signal continuously and any of our parking detectors 210 or 310 will detect them and display the data on the "user" device in an easy to understand method.

With our innovation you have the parking information that you want, when you want it, where you want it . . . (and at a price you can afford . . . )

Once you are in the vicinity of your destination and you switch on your detector, you will automatically receive the parking information along your route (in all directions around you). No further action is required (there is no need to send a request or to access the internet/web or log on and search a database or central system . . . !!!).

Our unique approach does not need an internet bandwidth nor cellular communication at all . . . .

And as a result there is no delay or waiting for communication and access time, the communication is instantaneous, directly between the sensors 410 and the "user" parking detector ether 210 or 310.

Parking detector, the empty parking spaces will be displayed inside a graphical real-time floating omni-directional circular display in such way that the "user"/car 420 will intuitively determine the distance and the direction to the empty parking spaces.

It must be noted that any Bluetooth enable device can be serve as a parking detector using our application method and it is not limited to cellular phone 210 and or in-car navigation 310.

Turning to FIG. 5, the illustration shows the method of broadcasting the empty parking space information to the parking detectors in the area.

The RF sensor 510 will detect 540 the empty parking space and only then 520 will broadcast 550 to the parking detectors 560.

If the area is occupied then there is no 530 broadcasting at all.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

I claim:

1. A wireless parking detector, comprising:
 a series of parking space status sensors, each parking space status sensor comprising a RF transmitter and a vehicle sensor, each parking space status sensor comprising a unique sensor broadcast name, each parking space status sensor being positioned proximate a unique parking spot, wherein the parking space status sensor monitors a vacancy status of the parking space, and the RF transmitter emits repeated broadcasts of the unique sensor broadcast name only when the status of the parking space is determined as vacant; and
 a portable user's device providing a guide to a parking space, the portable user's device incorporating a monitoring system comprising parking space monitoring software and a signal receiver, wherein the signal receiver is configured to scan for all of the unique sensor broadcast names; and
 parking space monitoring software that references each unique sensor broadcast name to a parking space identified on a location map,
 wherein the repeated broadcasts are emitted from the RF transmitter and directly to the portable user's device, and
 wherein the parking space monitoring software determines the location of each empty parking space associated with each received unique sensor broadcast names from the scan and displays the each empty parking locations.

2. The wireless parking detector according to claim 1, wherein the parking ID to include a known address, price, and type of parking selected from the group consisting normal parking and handicap parking.

3. A method of identifying available parking spots, the method comprising the steps of:
 deploying a series of parking space status sensors, each parking space status sensors having a unique sensor broadcast name and is positioned and mapped respective to a unique parking space;
 monitoring the status of a series of parking space;
 determining the vacancy of each parking space being monitored;

emitting repeat broadcasts of the respective unique sensor broadcast name of each parking space only when the respective parking space is determined to be vacant, wherein the emitted repeat broadcasts are directly received by a portable user's device, the portable user's device incorporating a monitoring system comprising parking space monitoring software and a signal receiver, wherein the signal receiver is configured to scan for all of the unique sensor broadcast names;

scanning with the portable user's device to receive each of the emitted respective unique sensor broadcast names;

determining each empty parking space from the emitted respective unique sensor broadcast names; and communicating each empty parking space to an end user via a display device.

4. The method according to claim 3, wherein the empty parking space information is displayed as a stand alone application without background mapping.

5. The method according to claim 3, which further comprises displaying the empty parking space information over at least one of a facility map, an area map, and a floor plan downloaded to the display device.

6. The method according to claim 3, wherein the empty parking space information pertains to navigating a current parking area.

7. The method according to claim 6, which further comprises determining a current position of a vehicle based on known positions of the wireless parking sensors to the vehicle.

8. The method according to claim 7, which further comprises navigating to the current parking area using a mapping facility.

9. The method according to claim 3, which further comprises producing a parking ticket with an exact location to a park space for a vehicle, the parking ticket being distributed by a parking garage.

10. The method according to claim 3, which further comprises paying electronically the parking sensor which replaces a parking meter.

11. The method according to claim 3, wherein the parking sensor automatically debits the display device.

12. The method according to claim 7, which further comprises performing the determining step without an aid of a global positioning satellite system or central database system.

13. The method according to claim 3, which further comprises: registering an exact parking place location of a vehicle on the display device; and subsequently allow return to parking navigating to where the vehicle is parked.

14. The method according to claim 13, which further comprises displaying on the display device a mapping between a current position and the exact parking place location of the vehicle.

15. The method according to claim 3, which further comprises displaying additional information of an available parking space as a waypoint.

16. The method according to claim 3, which further comprises providing the display device with an omni directional circular display.

17. The method according to claim 3, which further comprises forming the display device as a head-up display device projecting onto a vehicle windshield and displaying the empty parking space information via the head-up device.

18. The method according to claim 16, which further comprises determining a distance to and a direction to an empty parking space with the omni directional circular display.

19. The method according to claim 3, which further comprises providing the display device with application software for displaying pre-loaded area maps or parking facility floor plans.

20. The method according to claim 3, which further comprises floating the empty parking space information over an existing floor plan.

21. The wireless parking detector according to claim 1, the RF transmitter transmits in accordance with a Bluetooth protocol.

22. The wireless parking detector according to claim 1, further comprising a cellular telephone, wherein the parking space monitoring software, signal receiver, and display are integrated into the cellular telephone.

23. The wireless parking detector according to claim 1, wherein the parking space monitoring software, signal receiver, and display are integrated into a user interface of a vehicle.

24. The wireless parking detector according to claim 1, further comprising a return to parking feature, wherein the return to parking feature saves the location in which a user's vehicle is parked.

* * * * *